J. W. AYLSWORTH.
MOLDED ARTICLE.
APPLICATION FILED SEPT. 10, 1914.
1,167,468.
Patented Jan. 11, 1916.
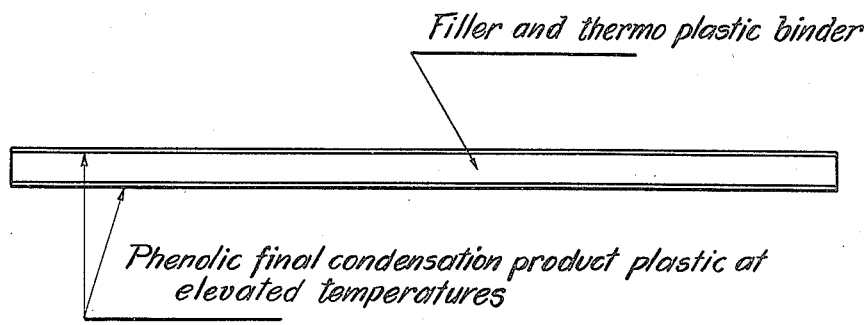

UNITED STATES PATENT OFFICE.

JONAS W. AYLSWORTH, OF EAST ORANGE, NEW JERSEY, ASSIGNOR, BY MESNE ASSIGNMENTS, TO NEW JERSEY PATENT COMPANY, OF WEST ORANGE, NEW JERSEY, A CORPORATION OF NEW JERSEY.

MOLDED ARTICLE.

1,167,468.     Specification of Letters Patent.     Patented Jan. 11, 1916.

Original application filed January 30, 1912, Serial No. 674,289. Patented July 13, 1915, No. 1,146,391. Divided and this application filed September 10, 1914. Serial No. 861,087.

*To all whom it may concern:*

Be it known that I, JONAS W. AYLSWORTH, a citizen of the United States, and a resident of East Orange, in the county of Essex, State of New Jersey, have invented certain new and useful Improvements in Molded Articles, of which the following is a description.

My invention relates to molded objects, such as sound records, and more particularly to such molded objects as are formed by the method or process described in my application, Serial No. 674,289, filed January 30, 1912, of which this application is a division. The said process involves the formation of a surface layer of material upon the smooth polished surface of a metallic plate or other blank mold and the transfer of the same to the surface of the object to be coated under heat and pressure with the firm adhesion or welding of the surface veneer to the object. The surface layer thus formed has a smooth homogeneous surface free from air bubbles, dust particles and the like, and is of a material which is hard when cold, but sufficiently plastic when heated, to take a clear impression from a mold or die, such as a sound record matrix.

The principal object of my invention accordingly is the production of such molded articles as will be more fully described hereinafter.

My present invention is in part a continuation of my application Ser. No. 579,130, filed August 26, 1910, method of molding sound records and other objects.

In its preferred form, my process consists essentially in coating the surface of a blank mold or polished plate with a solution or fused film of ingredients, which, upon being heated, form a surface layer or veneer on the mold surface of a hard infusible, insoluble, phenolic condensation product containing plasticity ingredients, such that the veneer becomes sufficiently plastic upon being reheated to take an impression, as stated. The object to be surfaced is pressed into contact with this hardened veneer in the mold with application of heat sufficient to cause the object and the surface layer to become firmly welded together, the molded object then being cooled and removed from the mold with the surface layer adhering thereto. The coated blank can then be heated and pressed in a sound record or other mold to receive the desired impression upon the surface thus formed. The process is not, however, limited to the use of phenolic condensation products, but may be practised with other substances having the desired properties, as will be described. For example, the surface veneer may be a lacquer composition of celluloid dissolved in a suitable solvent and the blank to which the same is transferred in the mold may consist of a gum-like binder and a suitable filler, such as wood flour.

Sound records and other objects having a surface layer are commonly made by forming the surface layer, placing the same upon the backing and then pressing the surface and backing together with sufficient heat to cause adhesion, the desired molded impression being formed at the same time. The advantages of first forming the surface layer upon a blank mold and then transferring the same directly from the mold surface to the backing, over the procedure referred to, are numerous. Where a thin surface layer of desired material, such as material suitable for forming sound records is made, it is usually impossible to handle the same and paste it to the backing without injury to the surface layer or film, because of the fact that the same is very thin and fragile. To overcome this difficulty, such films are often formed on or reinforced with paper or other fabric which is then cemented to the backing. The paper is comparatively rough and porous, and accordingly contains air bubbles and prevents the formation of the desired hard smooth surface upon the surface film when the latter is to receive a sound record or other delicate impression. By my process, no paper or other reinforcing means is necessary and the metal surface upon which the surface film is formed, can be coated with a film entirely free of air bubbles.

Another advantage over a process in which a paper strip or the like is used, is that the difference of coefficients of expansion of the varnish film and the paper are such as will ultimately cause the film to crack or have its surface impaired when exposed to extreme heat or cold, which difficulty is overcome by my invention.

In my process, the metal plate or blank mold can be highly finished and the film formed thereon will bear a replica of the same high smooth finish and when this film is transferred in the mold to the backing, the surfaced article thus formed will still bear the same highly polished surface. By this process also the surface of the film, which is subsequently to receive the sound record or other impression, is during the formation of the surface film, next to the metal surface of the blank mold and is accordingly protected at all stages of its formation and drying from dust and other impurities. The atmosphere in rooms where such work is carried on is always charged with dust particles and the smallest particle of dust adhering to the surface of a sound record for example, impairs the perfection of the surface of the sound record impressed thereon. Where varnished paper is used as a surface film, the latter is necessarily exposed to contamination from dust, lint, etc., at some stage of the drying operation during which particles of such foreign matter will be cemented to the outer surface of the film. Furthermore, by my process, if the surface veneer is a hard infusible phenolic condensation product and the backing contains rough particles or a fibrous filler, the backing being carefully made to have a substantially uniform thickness and density, the fibers or other rough elements of the backing cannot be impressed through the surface film during subsequent pressing because of the hardness of the surface material used. If the surface layer is made of materials which are less hard than that mentioned and the backing is of a varying thickness or density, some of the fibers or high spots of the backing are apt to be forced through the surface of the coated article in spots where the greatest pressure occurs, thus impairing the perfection of the sound record or other impression made.

In practising the invention, the polished surface of a blank mold may be painted with or dipped in a solution of the ingredients or the same may be applied to the surface of the mold by spraying in a uniform manner. The material applied to the blank surface may be a solution of a fusible soluble phenolic condensation product, such as the phenol resin described in my application, Ser. No. 496,060, filed May 14, 1909, upon which United States Patent No. 1,102,630 has been granted, together with a hardening agent therefor containing active methylene ($CH_2$) groups, such as hexa-methylene-tetra-amin, in a suitable solvent which may be either a volatile solvent, such as amyl alcohol, or a solid solvent, such as mono-nitro-naphthalene or other solvents referred to in my application, Ser. No. 496,060 referred to, or penta-chloro-phenol or other solvents referred to in my application Ser. No. 604,982, filed January 27, 1911, plastic phenolic condensation products, plastic phenolic condensation products, upon which United States Patent No. 1,046,137 has been granted. The veneer or coating formed upon the blank mold may be the enamel lacquer or varnish described in my application Ser. No. 543,239, filed Feb. 11, 1910, upon which United States Patent No. 1,098,608 has been granted. If a volatile solvent is used, it should be one whose boiling point is higher than the temperature at which it is desired to perform a final hardening reaction of the substance in solution into a refractory insoluble infusible condensation product. Preferably the veneer coating contains a solid solvent or plasticity ingredient, such as penta-chloro-phenol. Having coated the blank mold the same is dried, and heated sufficiently to cause the ingredients of the coating to react to form the final infusible insoluble refractory product referred to. The article to be coated, such as a blank phonograph record, which is preferably made of a phenolic condensation product or a mixture of the same with an inert filling material, is then pressed in the blank mold into contact with the surfacing layer formed in the blank mold as described, heat being applied sufficiently to cause the welding of the surface layer to the blank, and the transfer of the surface layer from the blank mold to the blank or backing upon the cooling and withdrawal of the backing from the mold. In some cases it will be well to varnish the surface of the blank or backing which is to be welded to the veneer film with some of the unhardened varnish before the backing is pressed into contact with the veneer to aid the adhesion of the two.

The coated articles, such as a blank phonograph record, which is thus formed with a smooth hardened surface layer, may be then pressed into or against a heated phonograph record matrix or other mold, the blank also being heated if necessary. Because of the character of the surface layer of the article and the presence therein of a plasticity component, such as described in my application Ser. No. 496,060, referred to, the sound record or other impression is formed in the surface thereof by the matrix in much the same manner that a similar record or impression is formed upon a heated celluloid blank pressed into a mold. The molded object thus formed is cooled and withdrawn from the mold.

As stated, the above described process may be carried out broadly with the use of other compositions than those described. Thus the veneer surface may be formed of celluloid dissolved in a suitable solvent, such as amyl acetate or alcohol and ether, and the blank or backing may be composed of a gum-like binder and a suitable filler such as wood flour or infusorial earth or a mixture of the same, such a composition consisting of approximately 100 parts of gum-like binder, and 100 to 300 parts of filler. The blank or backing in each case should be compressed and have a smooth polished surface before the same is pressed into contact with the veneer surface. In the case last referred to, the blank may be coated with a varnish such as a gutta percha solution to facilitate the transfer of the surface veneer thereo, when the binder of the backing is not of itself sufficiently adhesive to cause the veneer film to be transferred thereto when the heated blank is pressed into contact with the veneer. In addition to the substances referred to for the formation of the surface veneer, films formed of cellulose acetate or other cellulose esters may be used which may have compounded therewith a chlorinated fatty acid or derivative thereof, such as described in my Patent No. 855,556, dated June 4, 1907. Or the surface veneer may be formed from a varnish composition, comprising a cellulose ester, as acetyl cellulose, and a phenol or cresol resin, dissolved in acetylene-tetra-chlorid, with or without the addition of a halogenized fatty acid or derivative, and a small percentage of hexa-methylene-tetra-amin, all as is described in my application Ser. No. 668,942, filed January 2, 1912, and upon which United States Patent No. 1,094,830 has been granted.

The blank or backing should be made thermo-plastic or "hot plastic," that is, have the property of becoming plastic when heated, in equal or greater degree than the surface film. The binder used in the backing may be shellac, copal gum, kauri, rosin, or mixtures of the same, or a phenolic condensation product, preferably a fusible soluble phenol resin, such as that referred to above.

In the formation of disk phonograph records or other sound records in practising this invention, I preferably proceed as follows: A disk is formed from a powder which comprises approximately two parts of wood flour or other suitable filler and one part phenol resin or equivalent. This disk is made as nearly uniform in thickness and density as may be but certain parts of the surface thereof will be somewhat porous or slightly depressed. The surface of this disk or backing is then lacquered with some of the varnish composition of which the veneer is to be made, the lacquer being applied to the porous or depressed spots on the blank to fill the same up. The disk is then dried, and repressed in polished dies at a pressure which is somewhat less than the disk will thereafter be subjected to when the sound record impression is impressed in the surface veneer. The varnish may suitably be applied to the disk by spraying.

A hardened veneer is formed on a metallic smooth plate by coating the same as by spraying with a lacquer comprising approximately 100 parts phenol resin, 20 parts penta-chloro-phenol, 4 parts naphthalene, 6 to 8 parts hexa-methylene-tetra-amin all dissolved in 130 parts denatured alcohol or other solvent. This is dried and the excess of solvent eliminated by placing the metal plate with the lacquer thereon in an oven, and gradually raising the temperature over a period of ten hours up to 160° F. after which the temperature is raised to approximately 220° F. for a sufficient length of time to cause the reaction of the hexa-methylene-tetra-amin and phenol resin to form an infusible condensation product containing the penta-chloro-phenol as a plasticity ingredient. After the reaction is complete, the oven is allowed to cool down gradually to prevent cracking of the veneer.

When the veneer has been formed upon its metallic plate or blank mold, the blank disk previously formed as described, is welded to the veneer on the plate by pressing the blank into contact with the veneer at a less pressure than that at which the blank has been previously compressed, the pressure used not being sufficient to cause the blank to flow. The veneer is transferred from the metallic plate to the blank in this operation. Thereafter, if the sound record is to be formed upon the blank thus made, a record of the sound waves may be impressed upon the surface of the blank from a metallic matrix in such a manner as not to produce excessive flow of the base. By this means is formed a compound record disk having a hard but hot plastic surface and a plastic backing or body, there being, if desired, a record bearing surface veneer upon both sides of the backing. The backing consists of a substance which softens under the application of heat but which is given stiffness and ability to withstand excessive flow under pressure by the fibrous filler. Such a compound disk is permanently hot or thermo plastic both in the surface portion and in the backing and can be repressed a number of times successfully. In the case of sound records particularly, the lacquering of the body portion of the disk all over and especially at the porous spots is made to prevent "crackles" in the sound record, since it is difficult to make the body of the powdered resin or similar material containing a large amount of fibrous filler, without producing porous spots at the surface.

The process which I have described is an extremely cheap and practical method for manufacturing molded objects, such as those described, because of the comparative cheapness of the blank molds in which the surface veneer is formed.

In the drawing forming part of this specification is shown a side elevation of one embodiment of my invention, the materials employed in the said embodiment being described in the drawing.

Having now described my invention what I claim and desire to protect by Letters Patent is:—

1. A sound record or other object comprising a thermo plastic base having a surface veneer welded thereto, said surface veneer containing a final hardened phenolic condensation product and being sufficiently plastic at elevated temperatures to be pressed or molded, substantially as described.

2. A sound record or other object comprising a base of thermo plastic material containing a fibrous filling material distributed through the same and having a surface veneer welded thereto, said surface veneer containing a final hardened phenolic condensation product and being sufficiently plastic at elevated temperatures to be pressed or molded, substantially as described.

3. A sound record or other object comprising a base containing a fusible phenolic resin and having a surface veneer of final hardened phenolic condensation product secured thereto, substantially as described.

4. A sound record or other article comprising a base of fusible resin containing a finely divided filling material distributed through the same, and a surface veener welded to said base, said veneer containing a final hardened phenolic condensation product and being sufficiently plastic at elevated temperatures to be pressed or molded, substantially as described.

5. A sound record or other article comprising a base of fusible phenolic resin containing a fibrous filling material distributed through the same, and a surface veneer welded to said base, said veneer having a smooth surface free from air bubbles and extraneous particles and being formed of a hard infusible product, substantially as described.

6. A sound record or other object comprising a permanently thermo plastic base having a thin surface veener welded thereto, said veneer having a smooth surface free from air bubbles and extraneous particles and being formed of a final hardened phenolic condensation product of such a nature as to be permanently thermo plastic sufficiently to receive when heated a clear impression from a die, substantially as described.

7. A sound record or other object comprising a base of permanently thermo plastic material having a finely divided filling material distributed through the same, and having a thin surface veneer welded thereto, said veneer having a smooth surface free from air bubbles and extraneous particles and being formed of a final hardened infusible phenolic condensation product of such a nature as to be permanently thermo plastic sufficiently to receive when heated a clear impression from a die, substantially as described.

8. A sound record or other object comprising a base of fusible resin having secured thereto a surface veneer of final hardened infusible phenolic condensation product of such a nature as to be permanently thermo plastic sufficiently to receive when heated a clear impression from a die, substantially as described.

9. A sound record or other object comprising a base of fusible phenolic resin having secured thereto a surface veneer of final hardened infusible phenolic condensation product of such a nature as to be permanently thermo plastic sufficiently to receive when heated a clear impression from a die, substantially as described.

10. A sound record or other object comprising a base of fusible phenolic resin having secured thereto a surface veneer of hard infusible material of such a nature as to become sufficiently plastic when heated to receive a clear impression from a die, substantially as described.

11. A sound record or other object comprising a base of fusible phenolic resin having a fibrous filling material distributed through the same and having a surface veneer welded thereto, said veneer having a smooth surface free from air bubbles and extraneous particles and being formed of a hard permanently thermo plastic material, substantially as described.

12. A sound record or other object comprising a base containing a fusible phenolic resin and having a surface veneer of hardened phenolic condensation product secured thereto, substantially as described.

13. A sound record or other object comprising a base containing wood fiber and a suitable thermo plastic binder therefor, and a surface layer of hardened phenolic condensation product, said surface layer being sufficiently thermo plastic to take when heated a clear impression from a die, substantially as described.

14. A sound record or other object comprising a base containing wood fiber and a suitable thermo plastic binder therefor, the filler being in excess of the binder, and a surface layer containing a final hardened phenolic condensation product, said surface layer being sufficiently thermo plastic to take when heated a clear impression from a die, substantially as described.

This specification signed and witnessed this 2nd day of September 1914.

JONAS W. AYLSWORTH.

Witnesses:
FREDERICK BACHMANN,
MARY J. LAIDLAW.